United States Patent
Setomoto et al.

(10) Patent No.: US 9,554,448 B2
(45) Date of Patent: Jan. 24, 2017

(54) ILLUMINATION CONTROL DEVICE, LIGHT SOURCE FOR ILLUMINATION, AND ILLUMINATION SYSTEM

(71) Applicant: Panasonic Intellectual Property Management Co., Ltd., Osaka (JP)

(72) Inventors: Tatsumi Setomoto, Osaka (JP); Tamotsu Ando, Osaka (JP)

(73) Assignee: Panasonic Intellectual Property Management Co., Ltd.

( * ) Notice: Subject to any disclaimer, the term of this patent is extended or adjusted under 35 U.S.C. 154(b) by 1 day.

(21) Appl. No.: 14/413,935

(22) PCT Filed: Jul. 10, 2013

(86) PCT No.: PCT/JP2013/004263
§ 371 (c)(1),
(2) Date: Jan. 9, 2015

(87) PCT Pub. No.: WO2014/010239
PCT Pub. Date: Jan. 16, 2014

(65) Prior Publication Data
US 2015/0173157 A1 Jun. 18, 2015

(30) Foreign Application Priority Data
Jul. 13, 2012 (JP) ................. 2012-157918

(51) Int. Cl.
*H05B 37/02* (2006.01)
*H05B 33/08* (2006.01)

(52) U.S. Cl.
CPC ...... *H05B 37/0227* (2013.01); *H05B 33/0842* (2013.01); *H05B 33/0857* (2013.01);
(Continued)

(58) Field of Classification Search
CPC .............. H05B 37/0272; H05B 37/029; H05B 37/0281; H05B 33/0815; H05B 33/0845; H05B 33/0854; H05B 33/0842; H05B 37/0227; F21V 19/04; F21V 21/30; F21V 23/04; F24F 11/0034; Y02B 20/42
(Continued)

(56) References Cited

U.S. PATENT DOCUMENTS

| 7,619,366 B2 * | 11/2009 | Diederiks | H05B 37/0227 250/214 AL |
| 8,456,102 B2 * | 6/2013 | Yoshii | H05B 37/0227 315/158 |

(Continued)

FOREIGN PATENT DOCUMENTS

| CN | 101854763 A | 10/2010 |
| CN | 102027807 A | 4/2011 |

(Continued)

OTHER PUBLICATIONS

Chinese Office Action and Search Report (with English translation) for corresponding Chinese Application No. 201380036562.5 mailed on Sep. 21, 2015.
(Continued)

*Primary Examiner* — Haissa Philogene
(74) *Attorney, Agent, or Firm* — Renner, Otto, Boisselle & Sklar, LLP.

(57) ABSTRACT

An illumination control device (100) includes a motion detector (110) and a control unit (150) which perform control of illuminance, color, or distribution of light of an illumination light source (210) based on a result of detection by the motion detector (110).

14 Claims, 15 Drawing Sheets

(52) U.S. Cl.
CPC ..... *H05B 37/0272* (2013.01); *H05B 37/0281* (2013.01); *Y02B 20/44* (2013.01)

(58) Field of Classification Search
USPC .. 315/149, 159, 294, 307, 312, 360; 362/20, 362/239, 276
See application file for complete search history.

(56) References Cited

U.S. PATENT DOCUMENTS

| | | | | |
|---|---|---|---|---|
| 8,491,159 | B2* | 7/2013 | Recker | H02J 9/02 362/20 |
| 8,587,222 | B2* | 11/2013 | Amutham | H05B 37/0227 315/152 |
| 8,599,265 | B2* | 12/2013 | Kim | G06K 9/00355 348/164 |
| 8,669,716 | B2 | 3/2014 | Recker et al. | |
| 8,770,060 | B2 | 7/2014 | Maruyama et al. | |
| 8,830,067 | B2 | 9/2014 | Igaki et al. | |
| 8,836,505 | B2* | 9/2014 | Noda | H05B 37/0227 340/541 |
| 9,326,364 | B2* | 4/2016 | Maeda | H05B 37/0281 |
| 2009/0059603 | A1 | 3/2009 | Recker et al. | |
| 2011/0211110 | A1 | 9/2011 | Doublet | |
| 2012/0019165 | A1 | 1/2012 | Igaki et al. | |
| 2013/0152725 | A1 | 6/2013 | Maruyama et al. | |
| 2013/0158684 | A1 | 6/2013 | Takehara et al. | |
| 2014/0139137 | A1 | 5/2014 | Recker et al. | |
| 2014/0251069 | A1 | 9/2014 | Maruyama et al. | |

FOREIGN PATENT DOCUMENTS

| | | |
|---|---|---|
| CN | 102129225 A | 7/2011 |
| CN | 201910957 U | 7/2011 |
| CN | 102162609 A | 8/2011 |
| JP | 2004-303685 | 10/2004 |
| JP | 2005-203275 A | 7/2005 |
| JP | 2008-016289 | 1/2008 |
| JP | 2008-041457 | 2/2008 |
| JP | 2010-044982 A | 2/2010 |
| JP | 2010-198877 | 9/2010 |
| JP | 2010-211994 A | 9/2010 |
| JP | 2011-029094 A | 2/2011 |
| JP | 2011-151630 | 8/2011 |
| JP | 2012-002720 | 1/2012 |
| JP | 2012-507822 A | 3/2012 |
| JP | 2012-069503 | 4/2012 |
| WO | WO 2009/029960 A2 | 3/2009 |
| WO | WO 2012/029177 A1 | 3/2012 |
| WO | WO 2012/029503 A1 | 3/2012 |

OTHER PUBLICATIONS

International Search Report for corresponding International Application No. PCT/JP2013/004263 mailed Sep. 10, 2013.
Form PCT/ISA/237 for corresponding International Application No. PCT/JP2013/004263 dated Sep. 10, 2013.
Japanese Office Action for corresponding Japanese Application No. 2014-524655 issued on Jun. 2, 2015.

* cited by examiner

ILLUMINATION CONTROL DEVICE, LIGHT SOURCE FOR ILLUMINATION, AND ILLUMINATION SYSTEM

TECHNICAL FIELD

The present invention relates to illumination control devices, and particularly to an illumination control device for controlling illuminance, color, or distribution of light of an illumination device.

BACKGROUND ART

In recent years, light emitting diodes (LEDs) have been used as light sources of illumination devices. In particular, LED lamps have been drawing attention as illumination light sources which are taking the place of conventionally known fluorescent lamps and incandescent lamps.

Meanwhile, there have been proposed various methods of controlling illumination devices, such as a method in which a remote control device is used. For example, Patent Literature (PTL) 1 discloses an illumination control system for controlling an illumination device. The illumination control system captures an image of an illumination setting instructor (user), performs image recognition on the captured image, and controls the illumination device according to gestures of the user.

CITATION LIST

Patent Literature

[PTL 1] Japanese Unexamined Patent Application Publication No. 2008-16289
[PTL 2] Japanese Unexamined Patent Application Publication No. 2012-2720

SUMMARY OF INVENTION

Technical Problem

The configuration disclosed in PTL 1 requires constituent elements such as an image capturing unit and image recognition unit for illumination control. Accordingly, such illumination control devices are difficult to simplify or miniaturize.

The object of the present invention is to provide an illumination control device with a simple configuration which allows users to control illumination with ease.

Solution to Problem

Conceived to solve the above-described problem, an illumination control device according to an aspect of the present invention is an illumination control device which controls an illumination light source and includes a motion detector; and a control unit configured to perform control of illuminance, color, or distribution of light of the illumination light source based on a result of detection by the motion detector.

Furthermore, in an aspect of the present invention, the motion detector may detect a gesture which is an intentional movement of a user made for controlling the illumination light source, and the control unit may be configured to perform the control of the illuminance, color, or distribution of the light of the illumination light source based on the result of the detection of the gesture by the motion detector.

Furthermore, in an aspect of the present invention, the control unit may be configured to perform the control of the illuminance, color, or distribution of the light of the illumination light source based on an ON period or an OFF period, the ON period being a period during which a person is detected by the motion detector, and the OFF period being a period during which no person is detected by the motion detector.

Furthermore, in an aspect of the present invention, the control unit may be configured to perform the control of the illuminance, color, or distribution of the light of the illumination light source based on a total number of occurrences of the OFF period, the OFF period having a predetermined duration or longer in a predetermined period.

Furthermore, in an aspect of the present invention, the control unit may be configured to perform the control of the illuminance, color, or distribution of the light of the illumination light source based on a total number of occurrences of the ON period, the ON period having a predetermined duration or longer in a predetermined period.

Furthermore, in an aspect of the present invention, the control unit may further include a transmitter which wirelessly transmits, to the illumination light source, a control signal to allow the control unit to perform the control of the illuminance, color, or distribution of the light of the illumination light source.

Furthermore, in an aspect of the present invention, the transmitter may wirelessly transmit the control signal to a plurality of the illumination light source including the illumination light source.

Furthermore, in an aspect of the present invention, the illumination control device may further include a receiver which receives a notification signal wirelessly transmitted from an illumination light source among the plurality of the illumination light source, the notification signal indicating that the illumination light source is ON, wherein when the receiver receives the notification signal, the control unit may be configured to perform the control to cause all the plurality of the illumination light source to illuminate in a same state of illuminance, color, or distribution of light by causing the transmitter to wirelessly transmit the control signal to the plurality of illumination light source.

Furthermore, in an aspect of the present invention, the illumination control device may further include a light-emitting element which emits light in an ON period which is a period during which a person is detected by the motion detector.

Furthermore, in an aspect of the present invention, the illumination control device may further include an illuminance sensor which measures illuminance around the illumination control device, wherein when the illuminance measured by the illuminance sensor is lower than a predetermined illuminance, the control unit may be configured to perform the control of the illuminance, color, or distribution of the light of the illumination light source based on the result of detection by the motion detector.

Furthermore, in an aspect of the present invention, the illumination control device may further include a distance measurement unit configured to measure a distance from the illumination control device to a person detected by the motion detector, wherein when the distance measured by the distance measurement unit is within a predetermined range, the control unit may be configured to perform the control of the illuminance, color, or distribution of the light of the illumination light source based on the result of the detection by the motion detector.

Furthermore, in an aspect of the present invention, the illumination control device may further include a position locating unit configured to locate a position of a person detected by the motion detector, wherein when the position located by the position locating unit is within a predetermined range, the control unit may be configured to perform the control of the illuminance, color, or distribution of the light of the illumination light source based on the result of detection by the motion detector.

Furthermore, in an aspect of the present invention, the illumination control device may further include a velocity measurement unit configured to measure a moving velocity of a person detected by the motion detector, wherein when the moving velocity measured by the velocity measurement unit is within a predetermined range, the control unit may be configured to perform the control of the illuminance, color, or distribution of the light of the illumination light source based on the result of detection by the motion detector.

Furthermore, in an aspect of the present invention, the illumination light source may be a light emitting diode (LED) light source.

Furthermore, in an aspect of the present invention, the control unit may be configured to perform the control of the illuminance, color, or distribution of the light of the illumination light source by (i) when the motion detector detects a first gesture, performing first control to change, in a cycle, a mode of illumination of the illumination light source in one of the illuminance, color temperature, or a beam angle of the light of the illumination light source, and (ii) when the motion detector detects a second gesture, causing the illumination light source to illuminate in the mode of illumination at a time of the detection of the second gesture, the first gesture and the second gesture being included in the gesture.

Furthermore, an illumination light source according to an aspect of the present invention includes any of the above-described illumination control device.

Furthermore, an illumination system according to an aspect of the present invention includes: a plurality of illumination devices including a master illumination device and a plurality of slave illumination devices, the master illumination device including: an illumination light source; a motion detector; a control unit configured to perform control of illuminance, color, or distribution of light of the illumination light source of the master illumination device based on a result of detection by the motion detector; and a transmitter which wirelessly transmits, to the plurality of slave illumination devices, a control signal to allow the control unit to perform the control of the illuminance, color, or distribution of the light of the plurality of slave illumination devices, and the plurality of slave illumination devices each including: an illumination light source; a receiver which receives the control signal wirelessly transmitted from the control unit, wherein when the control unit performs the control to place the illuminance, color, or distribution of the light of the illumination light source of the master illumination device in a first state based on the result of detection by the motion detector, the control unit is configured to perform the control to place the illuminance, color, or distribution of the light of the illumination light source of each of the slave illumination devices in the first state by causing the transmitter to transmit the control signal to the receiver of each of the slave illumination devices.

Advantageous Effects of Invention

An illumination control device according to the present invention allows a user to control an illumination device by means of a motion detector.

DESCRIPTION OF EMBODIMENTS

Embodiments of the present invention shall be described below with reference to the drawings.

Each of the embodiments described below shows a general or specific example of the present invention. The values, materials, constituent elements, layout and connection of the constituent elements, steps, and the order of the steps in the embodiments are given not for limiting the present invention but merely for illustrative purposes only. Therefore, among the constituent elements in the following exemplary embodiments, constituent elements not recited in any one of the independent claims are described as optional constituent elements.

Embodiment 1

First, the following describes a configuration of an illumination control device according to Embodiment 1 of the present invention.

Figure 1:
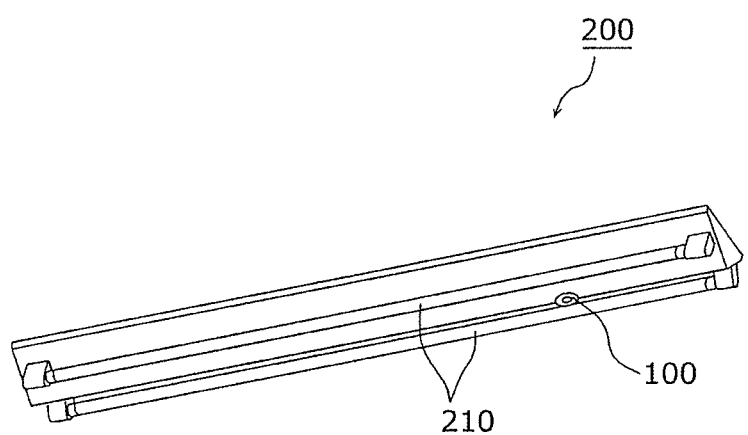
FIG. 1 illustrates a configuration of an illumination device according to Embodiment 1 of the present invention.

FIG. 1 illustrates a configuration of an illumination device according to Embodiment 1 of the present invention.

Figure 2:
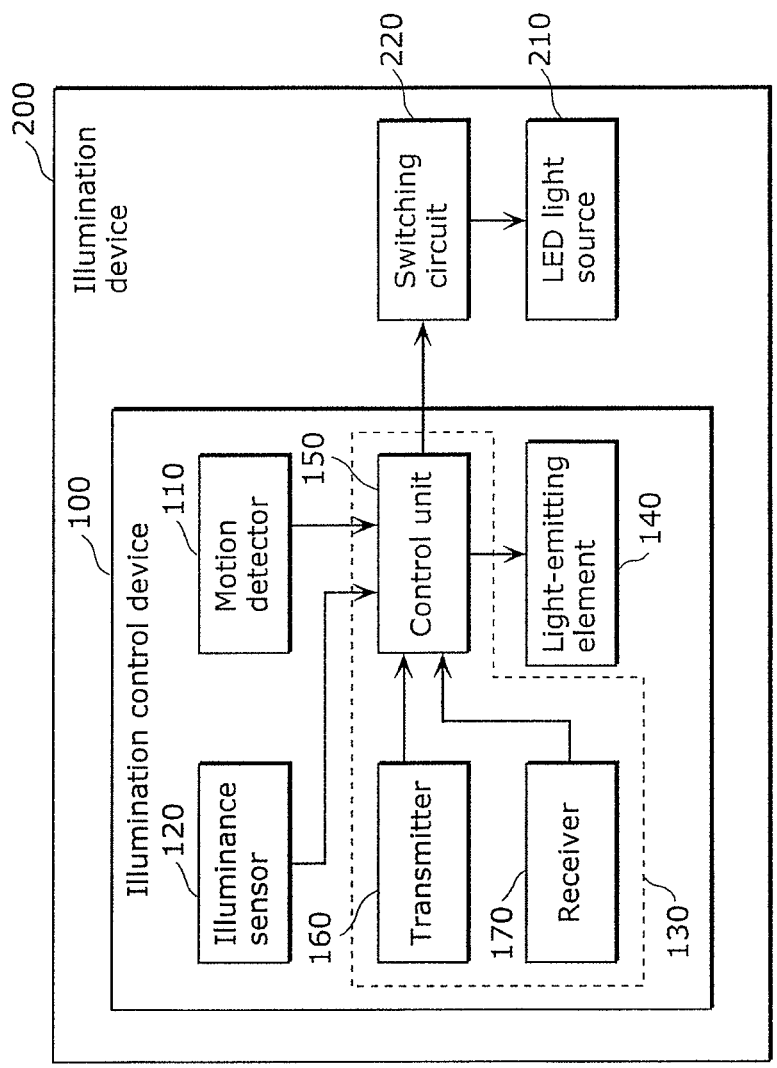
FIG. 2 is a block diagram illustrating a system configuration of the illumination device.

FIG. 2 is a block diagram illustrating a system configuration of the illumination device.

In Embodiment 1, an illumination control device 100 is included in an illumination device 200 having an LED light source 210 of straight tubes as illustrated in FIG. 1. More specifically, the illumination device 200 includes the illumination control device 100, the LED light source 210 (light source for illumination or also referred to as illumination light source), and a switching circuit 220 as illustrated in FIG. 2.

The illumination device 200 is capable of detecting a gesture of a user by means of a motion detector 110 included in the illumination control device 100, and changing illuminance of light of the LED light source 210. Furthermore, the illumination control device 100 is also capable of causing, via a wireless module, another illumination device on the same floor as the illumination device 200 to illuminate at an illuminance level equal to the illuminance level of the illumination device 200.

The LED light source 210 includes straight-tube light sources each including LEDs.

The switching circuit 220 is a driver circuit for switching the LED light source 210 between on and off.

The following describes the illumination control device 100 in detail using FIG. 2.

The illumination control device 100 includes a motion detector 110, an illuminance sensor 120, and a wireless module 130. The wireless module 130 includes a control unit 150, a transmitter 160, and a receiver 170.

The motion detector 110 detects presence of a person within a detection range. In Embodiment 1, the motion detector 110 is a passive sensor which detects infrared emitted from human bodies (temperature change) within a detection range. The motion detector 110 thus detects an object emitting thermal radiation. Furthermore, the motion detector 110 provides the control unit 150 with a control output which is a sensing signal indicating whether or not any person is present within the detection range.

In Embodiment 1, the motion detector 110 provides the control unit 150 with the sensing signal at a low level while detecting no person within the detection range, and provides the control unit 150 with the sensing signal at a high level while detecting a person within the detection range. The motion detector 110 may detect a person using an ultrasonic wave or visible light. The motion detector 110 may provide the control unit 150 with the sensing signal at a low level while a person is being detected within the detection range.

The illuminance sensor 120 measures illuminance around the illumination control device 100. The illuminance sensor is a general-purpose sensor module including a photo diode, for example. It is to be noted that the illuminance sensor 120 is a constituent element to allow the illumination control device 100 to switch to illuminance control mode according to illuminance around the illumination control device 100, and is an optional constituent element of the illumination control device 100.

The control unit 150 performs illuminance control of light of the LED light source 210 (illumination device 200) depending on ON periods and OFF periods. In the ON periods, the sensing signal output from the motion detector 110 is at a high level, and in the OFF periods, the sensing signal output from the motion detector 110 is at a low level. The "illuminance control" means control of illuminance of light of the LED light source 210 and does not include merely turning ON or OFF the LED light source 210.

The transmitter 160 wirelessly transmits, to another illumination device on the same floor as the illumination device 200, a control signal for control of illuminance of light of the other illumination device as described above. The illumination control device is thereby capable of controlling remote illumination devices (LED light source).

The receiver 170 receives notification signals sent from the illumination device 200 and another illumination device to notify the illumination control device 100 whether or not the LED light source included in the illumination device 200 and the LED light source included in the other illumination device are currently ON, respectively.

A light-emitting element 140 emits light in ON periods, during which a person is detected by the motion detector 110. This allows users to visually recognize ON periods by seeing the light-emitting element 140 lighting. The light-emitting element 140 is an LED, for example. The light-emitting element 140 may emit light in OFF periods, during which no person is detected by the motion detector 110, and be out in ON periods.

The following describes the configuration of the illumination control device 100 in further detail.

Figure 3:
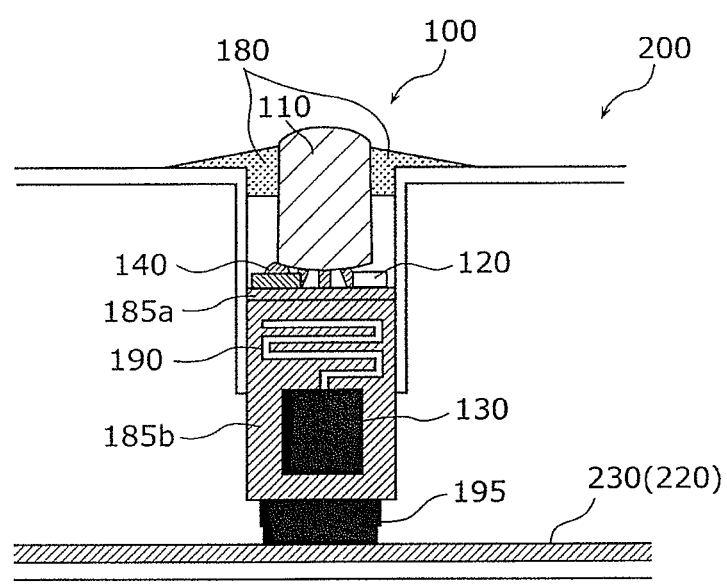
FIG. 3 is a vertical sectional view in a peripheral area of an illumination control device in the illumination device.

FIG. 3 is a vertical sectional view in a peripheral area of the illumination control device 100 in the illumination device 200.

As shown in FIG. 3, the motion detector 110, the light-emitting element 140, and the illuminance sensor 120 are mounted on a substrate 185a. The motion detector 110 has a translucent member 180 as a covering member provided on the side of a light-receiving surface of the motion detector 110. The translucent member 180 is a member made of a translucent plastic.

The substrate 185a is electrically connected to a substrate 185b on which a wireless module 130 and a patterned antenna 190 are mounted. The patterned antenna 190 is electrically connected to the wireless module 130. The patterned antenna 190 is a copper antenna formed in a pattern, for example, and functions as an antenna of the receiver 170. Thus, the receiver 170 receives the notification signals via the patterned antenna 190. In Embodiment 1, the wireless module 130 communicates in accordance with ZigBee (ZigBee is a registered trademark), which is one of standard specifications for wireless personal area network (WPAN). The communications scheme used with the wireless module 130 is not limited to this. The wireless module 130 may communicate using Bluetooth (Bluetooth is a registered trademark) or a wireless local area network (LAN).

The substrate 185b has a socket 195 made of a plastic on its one end, and the socket 195 connects the substrate 185b and a substrate 230 on which the switching circuit 220 is mounted. The substrate 185b and the substrate 230 are thus electrically connected. Furthermore, the socket 195 makes the illumination control device 100 freely detachable from the illumination device 200. The substrates 185a, 185b, and 230 are glass epoxy substrates, for example.

In Embodiment 1, the control unit 150, the transmitter 160, and the receiver 170 are configured as the wireless module 130 on the substrate 185b, but this configuration is not limiting.

The following describes operation of the illumination control device 100 and the illumination device 200.

The illumination control device 100 performs search (detection) of gestures of a user as follows. This search (detection) of gestures is a feature of the illumination control device 100.

Figure 4:
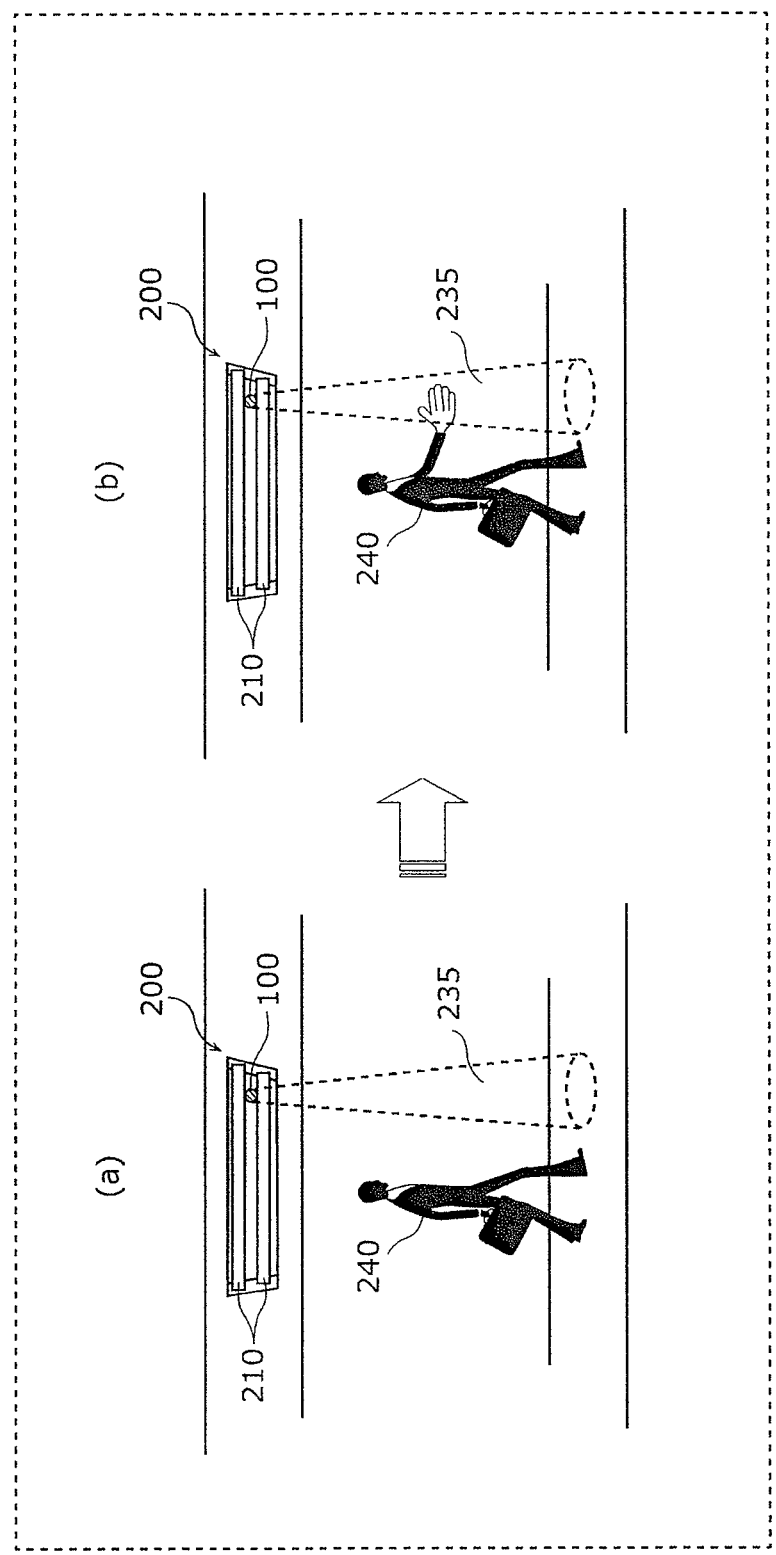
FIG. 4 schematically illustrates detection of gestures by a motion detector.

FIG. 4 schematically illustrates detection of gestures by the motion detector 110. In Embodiment 1, the gesture refers to an intentional movement of a user 240 made to control the illumination device 200. More specifically, in Embodiment 1, the motion detector 110 detects a gesture of the user 240, and the control unit 150 controls illuminance of light of the illumination device 200 according to a result of the detection of the gesture by the motion detector 110.

As illustrated in (a) and (b) in FIG. 4, the user 240 controls illuminance of light of the illumination device 200 (LED light source 210) by putting a hand in or out of a detection range 235 to adjust intervals of switching between ON periods and OFF periods of a sensing signal to be output by the motion detector 110.

Figure 5:
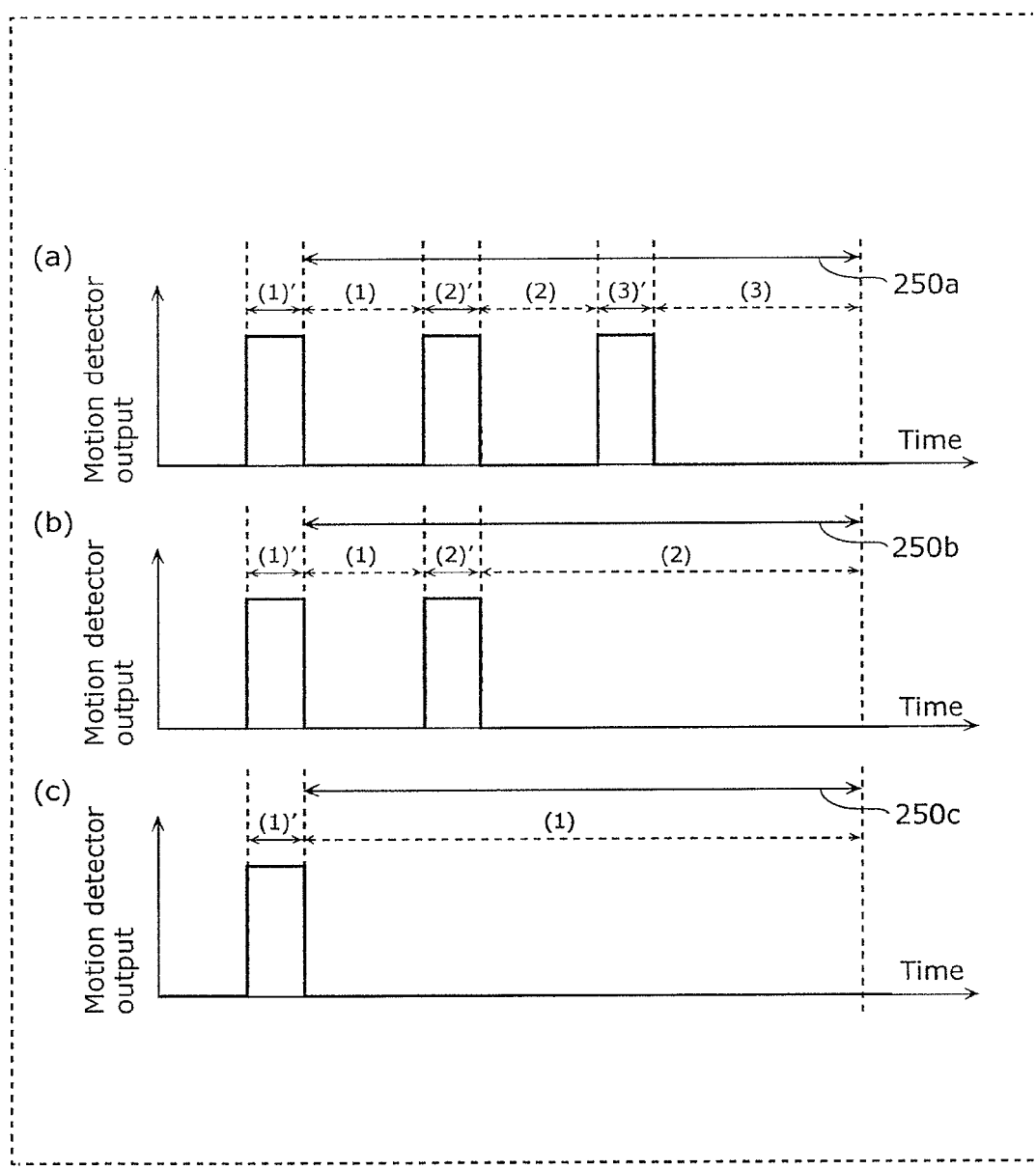
FIG. 5 illustrates types of gestures to be detected by the motion detector.

FIG. 5 illustrates types of gestures to be detected by the motion detector 110.

(a) in FIG. 5 illustrates a waveform of a sensing signal transmitted from the motion detector 110 to the control unit 150 in a normal mode so that the control unit 150 shifts to a first illuminance control mode (first operation mode). The first illuminance control mode will be described later.

In (a) in FIG. 5, periods (1)', (2)', and (3)' are ON periods. Thus, the periods (1)', (2)', and (3)' are periods during which the user 240 is having one of the user's hands in the detection range 235 of the motion detector 110 as illustrated in (b) in FIG. 4. Periods (1), (2), and (3) in (a) in FIG. 5 are OFF periods. Thus, the periods (1), (2), and (3) are periods during which the user 240 is not having any of the user's hands in the detection range 235 of the motion detector 110 as illustrated in (a) in FIG. 4. Thus, in Embodiment 1, the control unit 150 shifts to the first illuminance control mode after a user performs an illuminance control gesture, that is, puts a hand in and out of the detection range 235 three times in a predetermined period while the control unit 150 is in the normal mode.

More specifically, the control unit 150 shifts to the first illuminance control mode when the control unit 150 detects an OFF period not shorter than three seconds three times within a predetermined period 250a from the fall of the first ON period (1)' (the periods (1), (2), and (3) in (a) in FIG. 5). In the following, an OFF period not shorter than three seconds is also referred to as a gesture period.

Similarly, (b) in FIG. 5 illustrates a waveform of a sensing signal transmitted from the motion detector 110 to the control unit 150 in the first illuminance control mode so that the control unit 150 shifts to the normal mode. The first illuminance control mode will be described later.

In (b) in FIG. 5, periods (1)' and (2)' are ON periods, in which the user 240 is having one of the user's hands in the detection range 235 of the motion detector 110. Periods (1) and (2) in (b) in FIG. 5 are OFF periods, in which the user 240 is not having any of the user's hands in the detection range 235 of the motion detector 110. Thus, in Embodiment 1, the control unit 150 shifts from the first illuminance control mode to the normal mode after a user performs a canceling gesture, that is, puts a hand in and out of the detection range 235 twice in a predetermined period while the control unit 150 is in the first illuminance control mode.

More specifically, the control unit 150 shifts from the first illuminance control mode to the normal mode when the control unit 150 detects a gesture period twice within a predetermined period 250b from the fall of the first ON period (1)' (the periods (1) and (2) in (b) in FIG. 5).

Similarly, (c) in FIG. 5 illustrates a waveform of a sensing signal transmitted from the motion detector 110 to the control unit 150 in the first illuminance control mode so that the control unit 150 shifts to a second illuminance control mode (second operation mode). The first illuminance control mode will be described later.

In (c) in FIG. 5, period (1)' is an ON period, and a period (1) is an OFF period. Thus, in Embodiment 1, the control unit 150 shifts from the first illuminance control mode to the second illuminance control mode after a user performs a decision gesture, that is, puts a hand in and out of the detection range 235 once in a predetermined period while the control unit 150 is in the first illuminance control mode.

More specifically, the control unit 150 shifts from the first illuminance control mode to the normal mode when the control unit 150 detects a gesture period once within a predetermined period 250c from the fall of the first ON period (1)' (the period (1) in (b) in FIG. 5). When the control unit 150 in the second illuminance control mode detects a decision gesture, the control unit 150 stops control in the second illuminance control mode and starts control in the normal mode so that the illumination device 200 illuminates at an illuminance at the time of the detection of the decision gesture.

The predetermined periods 250a, 250b, and 250c and gesture periods may be set to have different time duration for each of the normal mode, the first illuminance control mode, and the second illuminance control mode. The total number of detected occurrences of a gesture period is not limited to the above-described numbers.

The illumination control device 100 may be configured to allow a user to pre-register (set) desired gestures as the illuminance control gesture, the decision gesture, and the canceling gesture.

In this case, the illumination control device 100 further includes a memory unit which stores detection patterns which are set by a user and used as a trigger for control of illuminance, color, or distribution of light by the control unit 150. When the control unit 150 determines that a result of detection by the motion detector 110 substantially match (or is almost the same as) a detection pattern stored in the memory unit, the control unit 150 starts control of illuminance. Here, "substantially match" means that, for example, the result of the detection and the detection pattern match within a predetermined allowable tolerance.

In Embodiment 1, the control unit 150 controls illuminance of light of the illumination device 200 based on the number of gesture periods in a predetermined period as described above.

Optionally, the control unit 150 may use an ON period not shorter than a predetermined duration (time width) as a gesture period and control illuminance of light of the illumination device 200 based on the number of the gesture periods in a predetermined period.

However, when the motion detector 110 detects presence of a person by sensing a temperature change using infrared as described in Embodiment 1, an ON period of the sensing signal output by the motion detector 110 may not be stable enough even when a person is present in the detection range 235. More specifically, the motion detector 110 may output a sensing signal having alternating short ON and OFF periods in a period in which the motion detector 110 should be outputting a sensing signal at an ON period as illustrated in FIG. 5. Thus, in Embodiment 1, the control unit 150 uses an OFF period as a gesture period for the sake of reliability in gesture detection.

The following describes the normal mode, the first illuminance control mode, and the second illuminance control mode of the illumination control device 100 (control unit 150).

In the normal mode, the control unit 150 causes the illumination device 200 (LED light source) to illuminate at a certain illuminance. When the control unit 150 in the normal mode detects an illuminance control gesture described above, the control unit 150 starts control in the first illuminance control mode.

Figure 6:
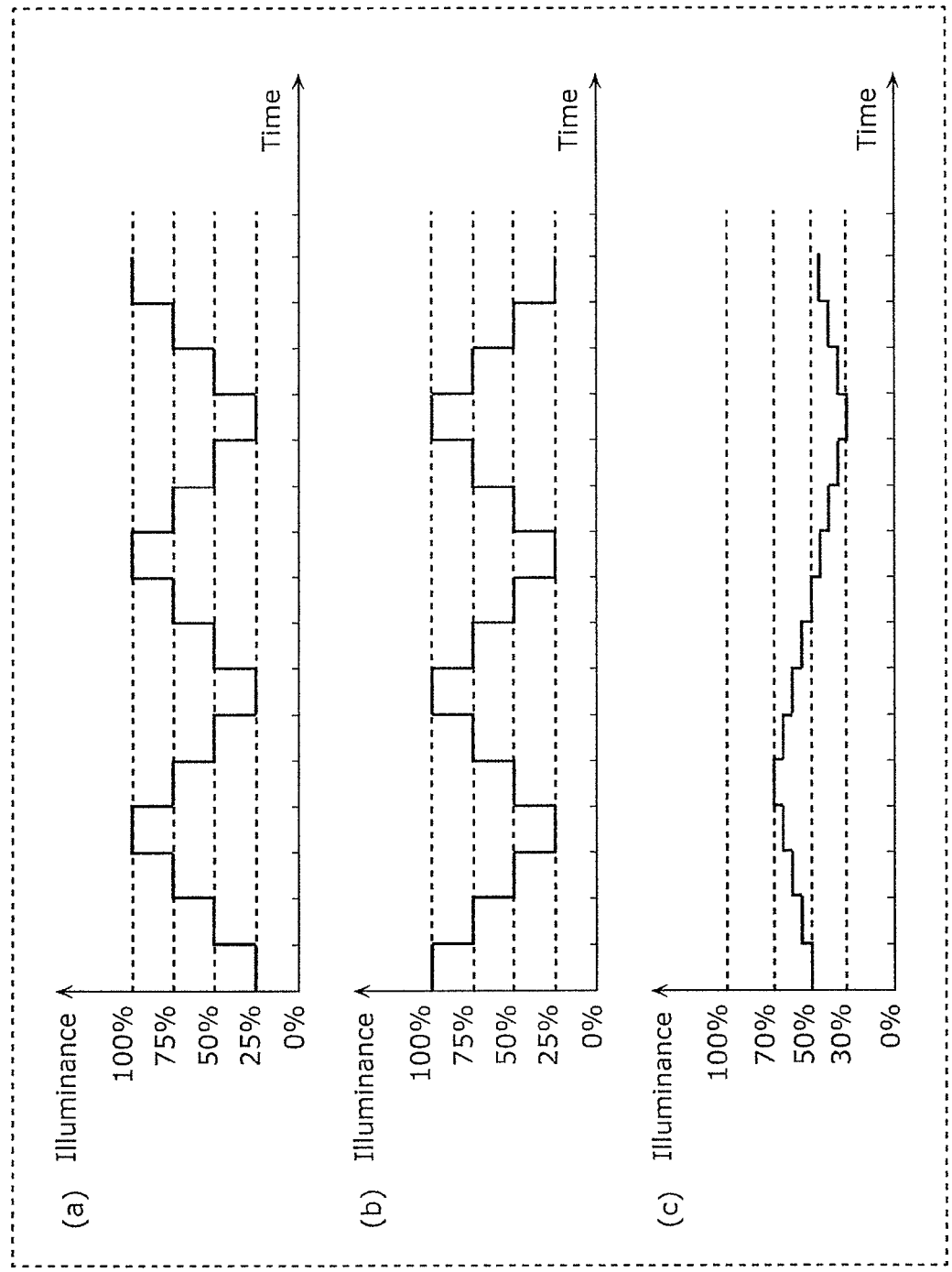
FIG. 6 illustrates control in a first illuminance control mode and control in a second illuminance control mode.

FIG. 6 illustrates control in the first illuminance control mode and control in the second illuminance control mode.

In the first illuminance control mode, the control unit 150 changes the illuminance of light of the LED light source 210 in a cycle. In the description of Embodiment 1, the minimum illuminance of light of the LED light source 210 in the first illuminance control mode is 25% of the maximum illuminance (hereinafter abbreviated to 25% illuminance). More specifically, as illustrated in (a) in FIG. 6, the control unit 150 increases the illuminance of light of the LED light source 210 from 25% illuminance to 100% illuminance stepwise in increments of 25%. After the illuminance reaches the maximum illuminance, the control unit 150 decreases the illuminance of light of the LED light source 210 from 100% illuminance to 25% illuminance stepwise in increments of 25%. The illuminance of light of the first LED light source 210 therefore changes in a stepwise manner with time.

The control unit 150 changes the illuminance of light of the LED light source 210 by controlling the number of LEDs to illuminate among the LEDs provided in the LED light source 210. Optionally, the control unit 150 may change illuminance by changing current to flow into the LEDs in the LED light source 210 using pulse width modulation (PWM) control.

Referring to (a) in FIG. 6, the LED light source 210 illuminates at 25% illuminance (minimum illuminance) immediately after the control unit 150 starts control in the first illuminance control mode. Optionally, the LED light source 210 may illuminate at 100% illuminance (maximum illuminance) immediately after the control unit 150 starts control in the first illuminance control mode as illustrated in (b) in FIG. 6.

The following describes the second illuminance control mode.

When the control unit 150 in the first illuminance control mode detects a decision gesture as described above, the control unit 150 starts control in the second illuminance control mode. In the first illuminance control mode, the control unit 150 performs control for coarse adjustment of illuminance of light of the LED light source 210. In the second illuminance control mode, the control unit 150 performs control for fine adjustment of illuminance of light of the LED light source 210.

In the second illuminance control mode, the control unit 150 causes the LED light source 210 to illuminate at illuminances changing in a cycle across a range centering around a first illuminance which is the illuminance at the time of the detection of the decision gesture. For example, when the first illuminance is 50% illuminance, the control unit 150 causes the LED light source 210 to illuminate at illuminances changing in a cycle across a range centering around the 50% illuminance.

In Embodiment 1, the control unit 150 in the second illuminance control mode changes the illuminance across a range of the first illuminance ±20% stepwise in increments of 5%. More specifically, as illustrated in (c) in FIG. 6, the control unit 150 increases the illuminance of light of the LED light source 210 from 50% illuminance to 70% illuminance stepwise in increments of 5%. After the illuminance reaches 70% illuminance, the control unit 150 decreases the illuminance of light of the LED light source 210 from 70% illuminance to 30% illuminance stepwise in increments of 5%. After the illuminance reaches 30% illuminance, the control unit 150 increases the illuminance of light of the LED light source 210 up to 70% illuminance stepwise in increments of 5%. Afterward, such a cyclic illuminance control is repeated.

In this manner, the absolute value of the change amount of the illuminance of light of the LED light source 210 in the second illuminance control mode is 5%, which is smaller than the absolute value of the change amount of the illuminance of light of the LED light source 210 in the first illuminance control mode, that is, 25%. Furthermore, the variation width of the illuminance of light of the LED light source 210 in the second illuminance control mode (maximum illuminance minus minimum illuminance) is 40%, which is smaller than the variation width of the illuminance of light of the LED light source 210 in the first illuminance control mode, that is, 75%.

When the control unit 150 in the second illuminance control mode detects a decision gesture, the control unit 150 stops control in the second illuminance control mode and starts control in the normal mode so that the illumination device 200 illuminates at a second illuminance which is the illuminance at the time of the detection of the decision gesture.

In this manner, providing the second illuminance control mode following the first illuminance control mode allows users to adjust the illuminance of light of the LED light source 210 more finely.

The second illuminance control mode is optional. For example, when the control unit 150 in the first illuminance control mode detects a decision gesture, the control unit 150 may stop control in the first illuminance control mode and starts control in the normal mode so that the illumination device 200 illuminates at an illuminance at the time of the detection of the decision gesture.

Optionally, a gesture for shifting from the first illuminance control mode to the second illuminance control mode and a gesture for setting illuminance in the first illuminance control mode may be set separately so that shifting to the second illuminance control mode can be optionally performed.

Optionally, in the first illuminance control mode and the second illuminance control mode, the control unit 150 may change the illuminance of light of the LED light source 210 in a cycle in a stepless manner by means of what is called analog dimming, instead of changing the illuminance of light of the LED light source 210 in a cycle in a stepwise manner.

Figure 7:
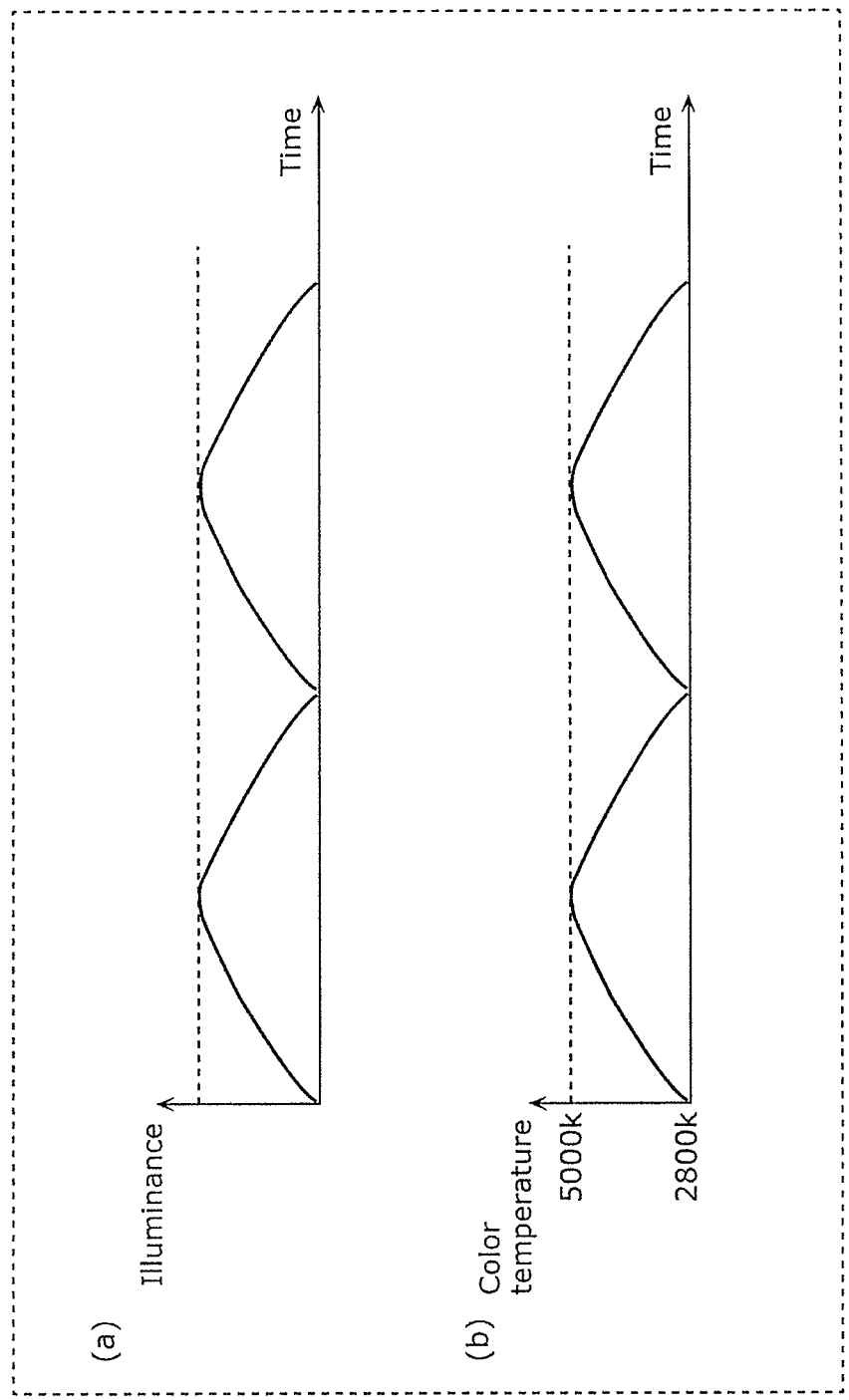
FIG. 7 illustrates an example of change in illuminance of light of an LED light source by analog dimming.

FIG. 7 illustrates an example of change in illuminance of light of the LED light source 210 by analog dimming.

Stepless change of illuminance as illustrated in (a) in FIG. 7 may be achieved by a circuit for analog dimming of LEDs provided to the illumination control device 100 or the illumination device 200, for example.

In the above description of the Embodiment 1, the control unit 150 changes the mode of illumination by changing illuminance, which is an example of control of illumination of the LED light source 210. Optionally, the control unit 150 may control color of light of the LED light source 210. More specifically, in an example of control of color, the control unit 150 may change color of light by changing color temperature. Optionally, the control unit 150 may change distribution of light of the LED light source 210. More specifically, for example, the control unit 150 may change distribution of light by changing the beam angle of the light.

Thus, the control unit 150 is configured to change the mode (state) of illumination in illuminance, color temperature, or beam angle, for example.

For example, the control unit 150 may have a color change mode in which the control unit 150 continuously changes the color temperature of the LED light source 210 in a cycle as illustrated in (b) in FIG. 7.

For example, the control unit 150 changes the color temperature, that is, controls the color of the LED light source 210 by controlling light transmission of nematic liquid crystal in the LED light source 210. The nematic liquid crystal has dichroism pigments, and the light transmission of the nematic liquid crystal is controlled by application of voltage. Optionally, the LED light source 210 may include LEDs of different color temperatures so that the control unit 150 can change the color temperature of the LED light source 210 by controlling the combination and number of the LEDs to illuminate.

Optionally, the control unit 150 may have a distribution change mode in which the control unit 150 changes the beam angle of the LED light source 210 in a cycle.

For example, the LED light source 210 is provided with a driving mechanism (driving unit) for changing the beam angles of the LEDs in the LED light source 210, and the control unit 150 changes the beam angle of the LED light source 210, that is, controls the distribution of light by controlling the driving unit by application of voltage. Optionally, the LED light source 210 may be provided with an optical member and a driving mechanism (driving unit) for changing the position or angle of the optical member so that the control unit 150 can change the beam angle by controlling the driving unit of the optical member. Optionally, the LED light source 210 may include LEDs mounted at different angles (that is, LEDs having different angles of light-emission plane) so that the control unit 150 can change the beam angle of the LED light source 210 by controlling the combination and number of the LEDs to illuminate.

The method of controlling illuminance using the motion detector 110 is not limited to the method in which the first illuminance control mode and the second illuminance control mode are used. For example, the control unit 150 may set the illuminance of light of the LED light source 210 depending on the number of gesture periods in a predetermined period. More specifically, the control unit 150 may set the illuminance of light of the LED light source 210 at 30% illuminance when a gesture period is detected three times, and at 70% illuminance when a gesture period is detected seven times.

The following describes a specific aspect of an illumination system including the illumination control device 100. The following describes an illumination system including a plurality of illumination devices in a room by way of example for Embodiment 1.

Figure 8:
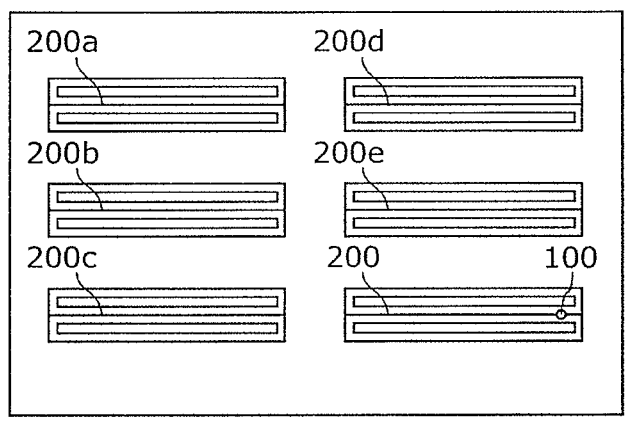
FIG. 8 is a layout chart of illumination devices included in an illumination system.

FIG. 8 is a layout chart of the plurality of illumination devices included in the illumination system (floor-to-ceiling view).

As illustrated in FIG. 8, the room has six illumination devices 200 and 200a to 200e which are straight tube illumination devices each including LED light sources. The illumination device 200 includes the illumination control device 100 and functions as a master illumination device in the illumination system. The illumination devices 200a to 200e are what is called slave illumination devices and do not include the illumination control device. On the other hand, as with the master illumination device, the illumination devices 200a to 200e each include a wireless module to receive a control signal wirelessly transmitted from the transmitter 160 of the illumination control device 100.

Thus, a control signal wirelessly transmitted from the transmitter 160 of the illumination device 200 is received by the receiver 170 of the illumination devices 200a to 200e, and the LED light sources of the illumination devices 200a to 200e switch ON and OFF under the same conditions as the illumination device 200.

The illumination control device 100 included in the illumination device 200 does not merely make use of a general motion detector which detects a person and turn on an illumination device. The motion detector 110 of the illumination control device 100 is provided to detect distinctive gestures and shift the operation program to the illuminance control mode, register data, or cancel an instruction.

The following describes operation of the illumination control device 100 of the illumination system in FIG. 8.

Figure 9:
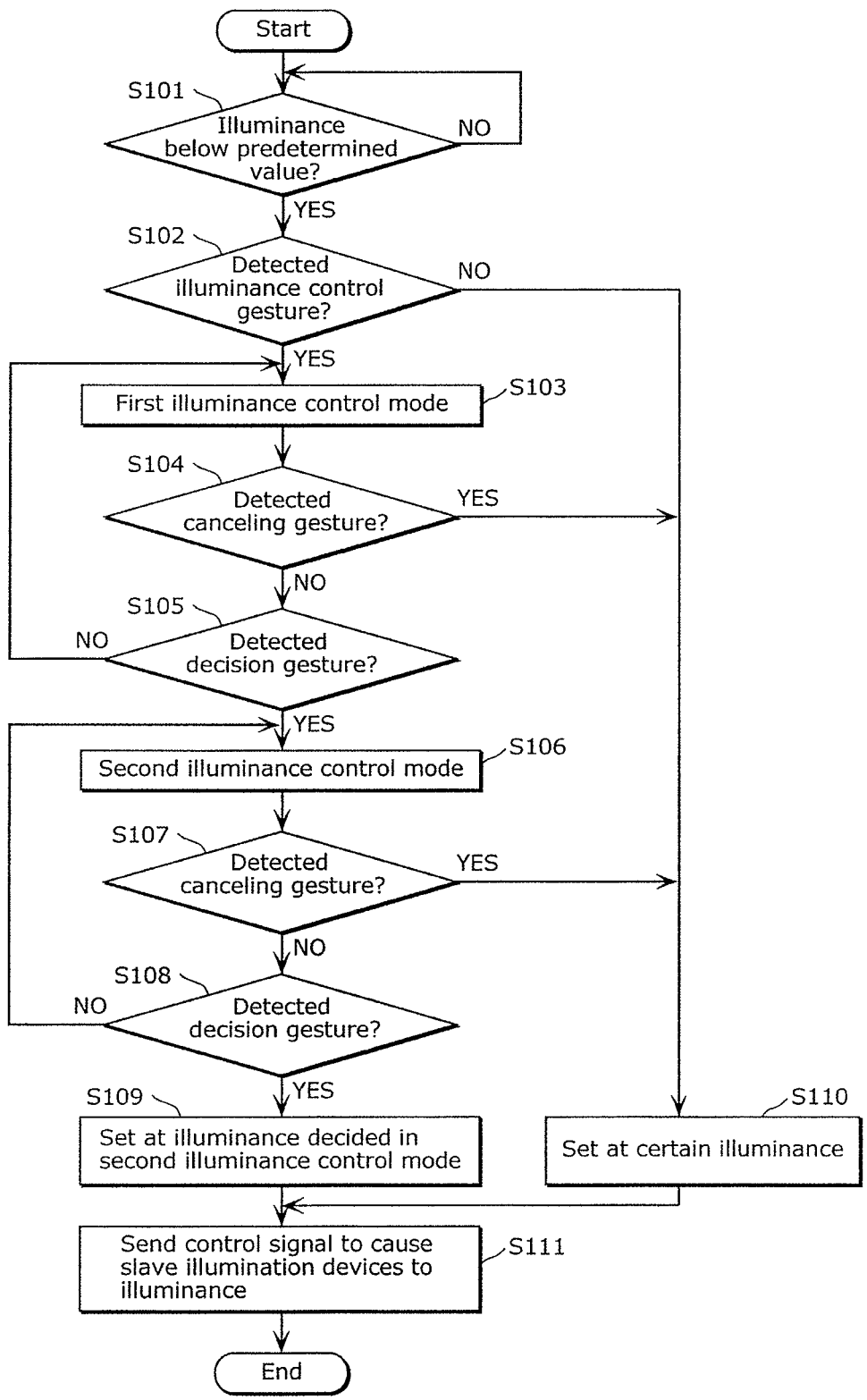
FIG. 9 is a flowchart of operation of the illumination control device.

FIG. 9 is a flowchart of operation of the illumination control device 100.

Figure 10:
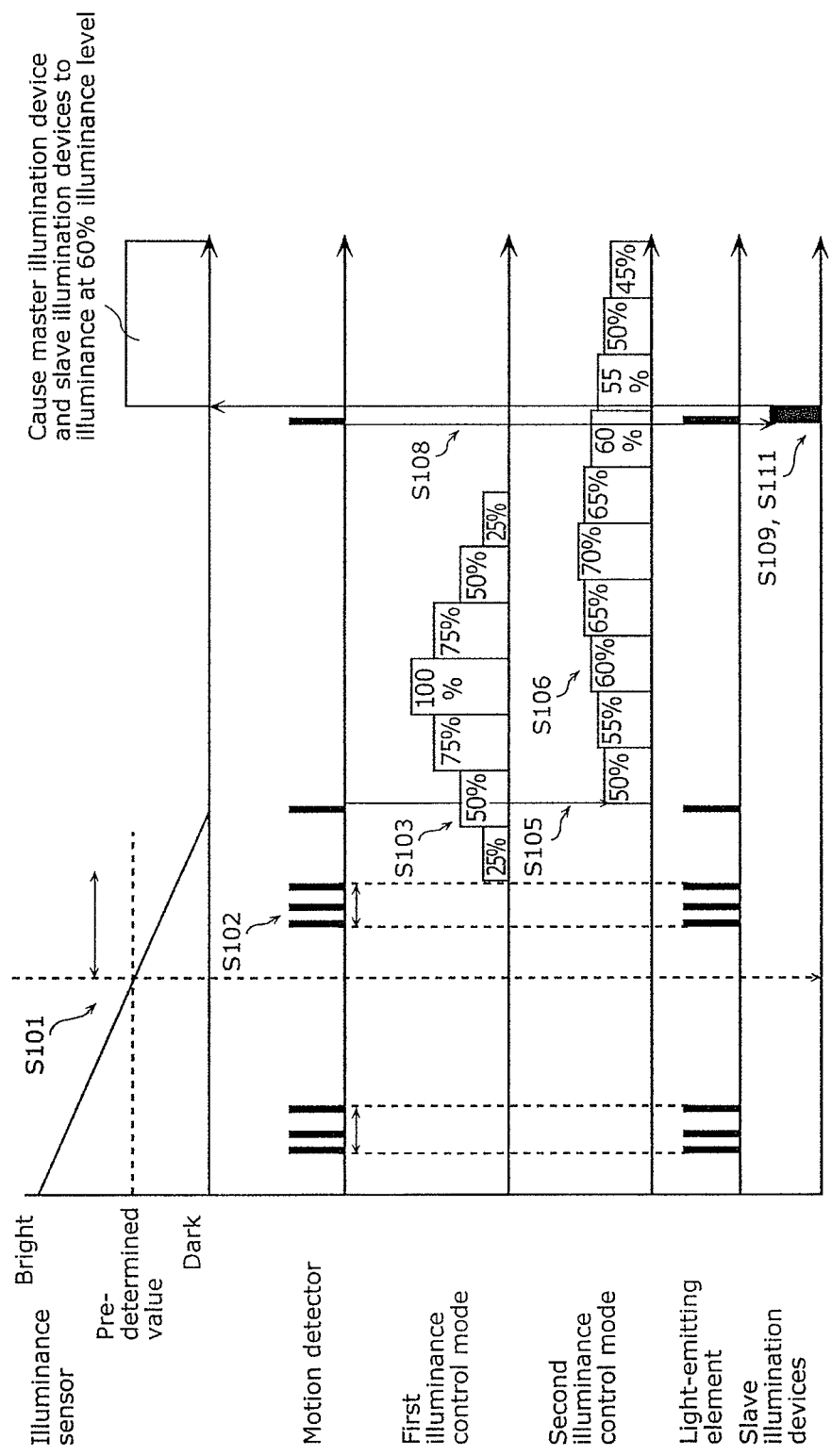
FIG. 10 is a schematic diagram illustrating operation of the illumination control device.

FIG. 10 is a schematic diagram illustrating operation of the illumination control device 100.

The illumination control device 100 measures illuminance using the illuminance sensor 120 (S101). When the illuminance around the illumination control device 100 is lower than a predetermined illuminance (S101, Yes), the control unit 150 detects an illuminance control gesture based on a result of detection by the motion detector 110 (S102). Optionally, the control unit 150 may detect an illuminance control gesture either when the illuminance around the illumination control device 100 is not lower than a predetermined illuminance or when the illuminance around the illumination control device 100 is in a predetermined illuminance range.

When the control unit 150 detects an illuminance control gesture (S102, Yes), the control unit 150 starts control in the first illuminance control mode (S103). More specifically, the control unit 150 changes the illuminance of light of the LED light source 210 in a cycle in the above-described stepwise manner.

When the control unit 150 in the first illuminance control mode detects a canceling gesture (S104, Yes), the control unit 150 starts control in the normal mode. More specifically, the control unit 150 causes the LED light source 210 to illuminate at a certain illuminance and sets a control signal to indicate the certain illuminance (S110). The control unit 150 sends the control signal indicating the certain illuminance to the illumination devices 200a to 200e to cause the illumination devices 200a to 200e to illuminate at the certain illuminance (S111).

When the control unit 150 in the first illuminance control mode detects not a canceling gesture (S104, No) but a decision gesture (S105, Yes), the control unit 150 starts control in the second illuminance control mode (S106). More specifically, the control unit 150 changes the illuminance of light of the LED light source 210 in a cycle in a stepwise manner across a range centering around a first illuminance.

When the control unit 150 in the second illuminance control mode detects a canceling gesture (S107, Yes), the control unit 150 starts control in the normal mode. More specifically, the control unit 150 causes the LED light source 210 to illuminate at a certain illuminance and sets a control signal to indicate the certain illuminance (S110). The control unit 150 sends the control signal indicating the certain illuminance to the illumination devices 200a to 200e to cause the illumination devices 200a to 200e to illuminate at the certain illuminance (S111).

When the control unit 150 in the second illuminance control mode detects not a canceling gesture (S107, No) but a decision gesture (S105, Yes), the control unit 150 cause the LED light source 210 to illuminate at a second illuminance and sets a control signal to indicate the second illuminance (S109). The control unit 150 sends the control signal indicating the second illuminance to the illumination devices 200a to 200e to cause the illumination devices 200a to 200e to illuminate at the second illuminance (S111).

The above described operation of the illumination control device 100 is an example, and the operation is not limited to the example in the order of the steps in the operation, for example.

In this manner, the illumination control device 100 is capable of controlling illuminance of light of all the illumination devices in a room. As can been seen from FIG. 10, users can visually recognize ON periods by seeing the light-emitting element 140 lighting.

Since the illumination devices 200a to 200e each include a wireless module, each (LED light source) of the illumination devices 200a to 200e is capable of transmitting a notification signal indicating that the illumination device is ON.

Upon receiving the transmitted notification signal via the receiver 170, the illumination control device 100 causes all the illumination devices 200a to 200e to illuminate at the same illuminance by transmitting such a control signal to the illumination devices 200a to 200e. In other words, when at least one of all the illumination devices in a room is ON, it is possible to cause all the illumination devices to illuminate at the same illuminance.

The illumination system according to Embodiment 1 has been described as an illumination system in which only the illumination device 200 includes the illumination control device 100. The illumination devices 200a to 200e may optionally have each own illumination control device 100.

The illumination device 200 according to Embodiment 1 is also capable of operation as a general illumination device with a motion detector. The "general illumination device with a motion detector" means operation of causing the LED light source 210 to illuminate for a certain period when the motion detector 110 detects a person in its detection range. Optionally, each of the illumination devices 200a to 200e may include a motion detector and is thereby capable of operation as the above-described general illumination device with a motion detector.

The above is a description of the illumination control device 100 according to Embodiment 1. The illumination control device 100 thus has a simple configuration including a motion detector 110 so that the illumination control device 100 may control illuminance, color, or distribution of light of an illumination device (LED light source) according to gestures of a user.

Embodiment 2

In Embodiment 1, the motion detector 110 of the illumination control device 100 is used only for detection of gestures. The following describes an example for Embodiment 2 in which a general illumination device with a motion detector which illuminates for a certain period upon detection of a person by the motion detector is further capable of detecting gestures. In Embodiment 2, the present invention is implemented as an LED light source including an illumination control device. When a conventional illumination device is provided with the LED light source, the illumination device is capable of controlling illuminance, color, or distribution of light according to gestures of a user.

For Embodiment 2, description of operation and functions of constituent elements substantially same as in Embodiment 1 is omitted.

Figure 11:
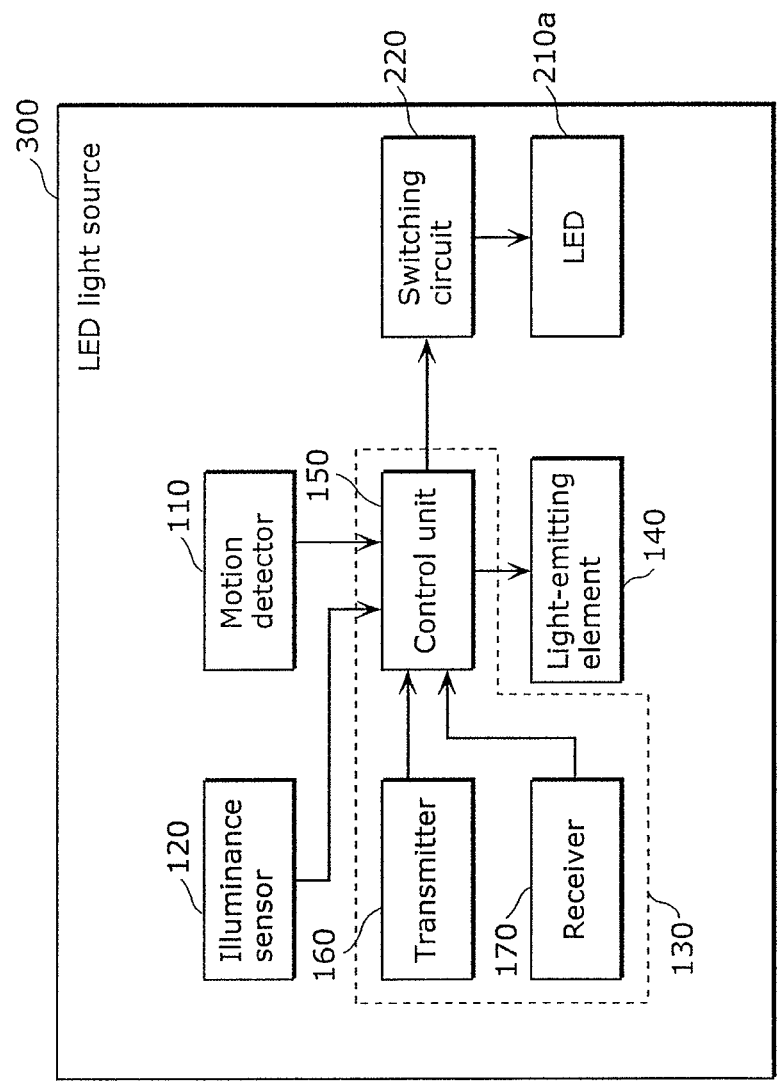
FIG. 11 is a block diagram illustrating a system configuration of an illumination device (LED light source) according to Embodiment 2.

FIG. 11 is a block diagram illustrating a system configuration of an illumination device (LED light source) according to Embodiment 2.

An LED light source 300 includes a motion detector 110, an illuminance sensor 120, and a wireless module 130 as illustrated in FIG. 11. The wireless module 130 includes a control unit 150, a transmitter 160, and a receiver 170. These constituent elements are implemented as the constituent elements of the illumination control device in Embodiment 1.

The LED light source 300 includes an LED 210a and a switching circuit 220. Alternatively, the switching circuit 220 may be provided to an illumination device on which the LED light source 300 is mounted.

The following describes a configuration of the LED light source 300 in further detail.

Figure 12:
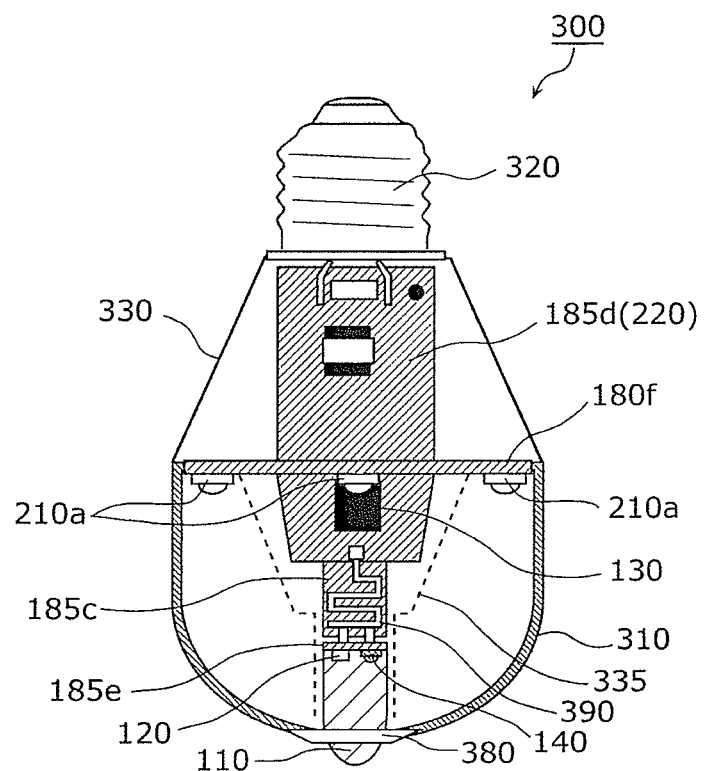
FIG. 12 illustrates a perspective view of a configuration of an LED light source according to Embodiment 2.

FIG. 12 illustrates a perspective view of a configuration of the LED light source 300 according to Embodiment 2.

As illustrated in FIG. 12, the LED light source 300 in Embodiment 2 is a bulb-type LED lamp including the motion detector 110.

The LED light source 300 has an envelope including a globe 310, a casing 330, and a cap 320. The envelope contains LEDs 210a, substrates 185c to 185e, a circuit case 335, the motion detector 110, and the illuminance sensor 120.

The globe 310 is a hemispherical translucent cover which allows light emitted from the LEDs 210a to radiate out of the lamp. The LEDs 210a, the motion detector 110, and part of the circuit case 335 are covered with the globe 310. The light of the LEDs 210a enters the inner surface of the globe 310, transmits the globe 310, and is let go outside the globe 310. The globe 310 has a translucent member 380 set in the globe 310 in the periphery of the motion detector 110.

The casing 330 lies between the globe 310 and the cap 320. The casing 330 is a case having an opening at each end and is substantially conical, or substantially cylindrical in shape tapering toward the cap from the globe.

The cap 320 is a power receiving part for receiving alternating-current power through two contacts and is fitted to a socket of a lighting apparatus. For example, the cap 320 is an Edison screw (designated as E) cap.

The LEDs 210a are chip LEDs inside the globe 310. The LEDs 210a are a plurality of LEDs mounted on the substrate 185f and emit light according to a sensing signal from the motion detector 110.

The circuit case 335 is electrically insulative, typically made of plastic. The circuit case 335 encloses the substrate 185d on which a switching circuit for the LEDs 210a, a control circuit for the motion detector 110, and a wireless module 130 (the control unit 150, transmitter 160, and receiver 170) are mounted. The circuit case 335 further encloses the substrate 185c on which a patterned antenna 390 is mounted and the substrate 185e on which the motion detector 110, the illuminance sensor 120, and the light-emitting element 140 are mounted.

The substrates 185d, 185e, and 185f are electrically connected.

The following describes a specific aspect of an illumination system including the LED light source 300. The following describes, by way of example for Embodiment 2, an illumination system including a plurality of illumination devices provided along a pathway.

Figure 13:
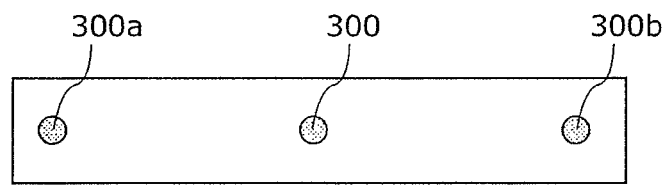
FIG. 13 is a top view illustrating a layout of LED light sources included in an illumination system according to Embodiment 2.

FIG. 13 is a top view illustrating a layout of a plurality of LED light sources in an illumination system according to Embodiment 2.

As illustrated in FIG. 13, the pathway is provided with three LED light sources, LED light sources 300, 300a, and 300c. The LED light sources 300 have same function as the above-described function of the illumination control device 100 in Embodiment 1, and thus functions as a master illumination device in the illumination system.

The LED light sources 300a and 300b are what is called slave illumination devices and do not have the function provided by the illumination control device 100. The LED light sources 300a and 300b each has a motion detector. More specifically, the LED light sources 300, 300a, and 300b each illuminate for a certain period of time when a person is detected in its own detection range.

As in Embodiment 1, the LED light sources 300a and 300b each include a wireless module to receive a control signal wirelessly transmitted from the transmitter 160 of the LED light source 300 and wirelessly transmit a notification signal indicating that the LED light source is illuminating.

The following describes operation of the illumination system in Embodiment 2.

Figure 14:
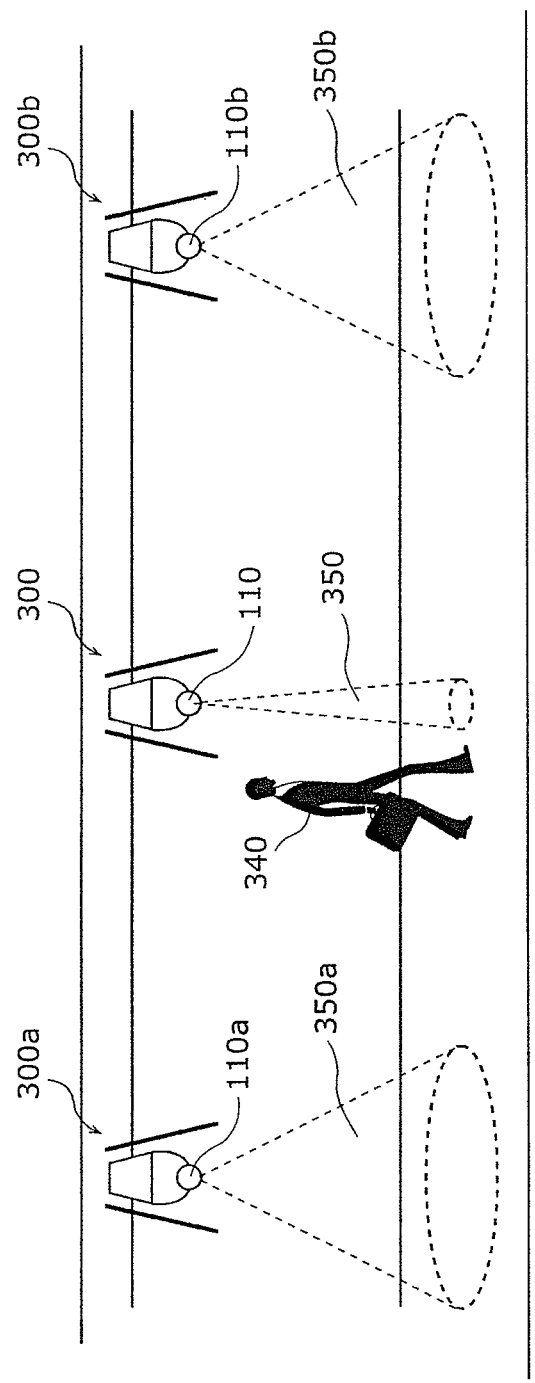
FIG. 14 is a schematic diagram illustrating operation of the illumination system according to Embodiment 2.

FIG. 14 is a schematic diagram illustrating operation of the illumination system according to Embodiment 2. The operation of the LED light source 300 for illumination control is the same as the operation of the illumination control device 100 described as Embodiment 1.

Referring to FIG. 14, when the user 340 enters a detection range 350a of the motion detector 110a, the LED light source 300a illuminates for a certain period of time. Similarly, when the user 340 enters a detection range 350 of the motion detector 110, the LED light source 300 illuminates for a certain period of time, and when the user 340 enters a detection range 350b of the motion detector 110b, the LED light source 300b illuminates for a certain period of time.

Thus, for example, when the user 340 walks down from left to right in FIG. 14 and enters the detection range 350a, usually only the LED light source 300a turns ON. However, the LED light sources 300 and 300a also turn ON upon receiving, via the wireless module, a notification signal indicating that the LED light source 300a is illuminating from the LED light source 300a. In other words, it is possible for the user 340 to turn ON the illumination devices ahead of the user 340.

When the user 340 wants to control the illuminance of light of the LED light sources 300, 300a, and 300b, the user 340 makes a gesture described for Embodiment 1 in the detection range 350 of the motion detector 110 of the LED light source 300.

When detection by the motion detector 110 is used both for ON-OFF switching control and for illuminance control as in Embodiment 2, the illumination system is likely to perform unwanted operation. In view of this, the LED light source 300 has the following features.

First, as in Embodiment 1, the LED light source 300 detects a gesture of the user 340 only when the illuminance detected by the illuminance sensor 120 is lower than a predetermined illuminance. In other words, the LED light source 300 detects a gesture of the user 340 only when illuminance control is highly necessary. The LED light source 300 thus performs only ON-OFF switching control according to a result of detection by the motion detector 110 when the illumination control is not highly necessary. Operating in this manner, the LED light source 300 is less likely to perform unwanted operation, such as unwanted shifting of the LED light source 300 (or control unit 150) to the first illuminance control mode, when the motion detector 110 detects something not a gesture of the user 340.

Secondly, as illustrated in FIG. 14, the detection range 350 of the motion detector 110 of the LED light source 300 is smaller than the detection range 350a of the motion detector 110a of the LED light source 300a and the detection range 350b of the motion detector 110b of the LED light source 300b. More specifically, the detection range 350 of the motion detector 110 of the LED light source 300 is designed to be smaller than detection ranges of general motion detectors for illumination devices so that the motion detector 110 can appropriately detect gestures of the user 340. In this configuration, the LED light source 300 is less likely to perform shifting to the illuminance control mode against the intention of the user 340.

The motion detector 110, which has been described as a passive infrared sensor, may be an active infrared sensor having a distance measurement function (distance measurement unit) so that the LED light source 300 is less likely to perform unwanted operation.

Figure 15:
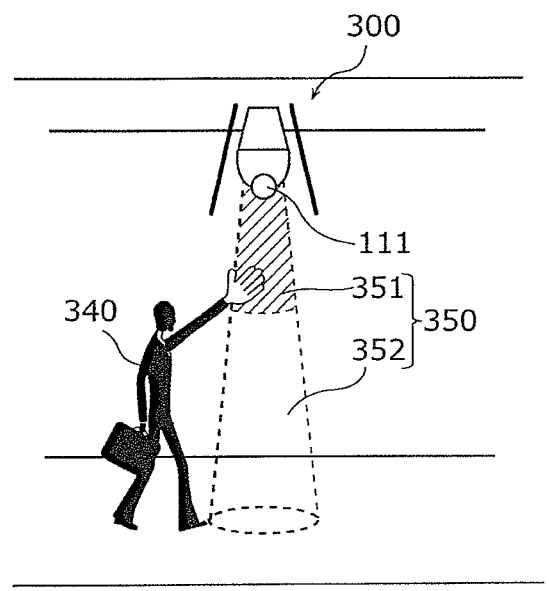
FIG. 15 schematically illustrates a gesture detection range of a motion detector having a distance measurement function.

FIG. 15 schematically illustrates a gesture detection range of the motion detector 111 having a distance measurement function.

In FIG. 15, the control unit 150 controls illumination of the illumination light source based on a result of detection by the motion detector 111 when the distance measured by the distance measurement unit is within a predetermined range of distance.

More specifically, as illustrated in FIG. 15, the control unit 150 recognizes movements of a user in a detection range 351, which is a predetermined range of distance to the user 340, as gestures of the user 340. On the other hand, the control unit 150 does not recognize motions of a user in a detection range 352, which is out of the predetermined range of distance to the user 340, as gestures of the user 340.

In the example illustrated in FIG. 15, the detection range 351 is set above the user 340, and therefore the LED light source 300 is unlikely to recognize a movement of the user 340 merely passing through there as a gesture. Thus, the motion detector 111 having a distance measurement function is also less likely to make unwanted operation of the LED light source 300.

The distance measurement unit, which has been described as being implemented as a function of the motion detector 111, may be provided separately from the motion detector 111. More specifically, the LED light source 300 (illumination control device) may further include a position locating unit which measures a distance from the LED light source 300 to a person detected by the motion detector 110 upon the detecting of the person. The distance measurement unit is typically an infrared sensor capable of measuring distance from the LED light source 300 to the user 340 by triangulation using infrared. Optionally, the distance measurement unit may measure distance using ultrasonic waves or laser.

Optionally, for example, a microwave sensor (Doppler sensor) may be used as the motion detector 110, and the motion detector 110 has a position locating function (position locating unit). More specifically, the LED light source 300 (illumination control device) may further include a position locating unit which locates the position of a person detected by the motion detector 110 upon the detecting of the person.

The microwave sensor is an active sensor using electric waves which belong to the band of microwaves in the radio spectrum, such as microwaves at 10.5 GHz or 24 GHz. The microwave sensor emits microwaves and receives microwaves reflected off an object to locate the position of the object.

The position locating unit performs the position locating using recognition techniques disclosed in PTL 2. More specifically, the position locating unit locates the position of a user by using data of feature quantity obtained by making use of the Doppler effect.

The data of feature quantity is calculated from a time-domain waveform and time-domain data of a reflected signal, a power spectrum obtained by converting the time-domain waveform and time-domain data into those in frequency domain, and so on. The reflected signal is a digital signal representing a reflected wave received by the motion detector 110 (microwave sensor). The data of feature quantity depends on the position of a user due to the Doppler effect.

If the illumination control device 100 is provided with a memory unit, the memory unit prestores data of feature quantities for different user positions. This allows the position locating unit to locate the position of a user in a room by determining whether or not the data of feature quantity stored in the memory unit and data of feature quantity calculated from a reflected signal at the time of detection of the motion detector 110 match each other.

When the position located by the position locating unit is within a predetermined range, the control unit 150 controls illumination of the LED light source 300 based on a result of detection by the motion detector 110.

This means that the motion detector 110 recognizes movements of a user within a predetermined range of distance as gestures of the user. On the other hand, the motion detector 110 does not recognize movements of a user outside the predetermined range as gestures of the user.

In this manner, the motion detector 110 including the position locating unit detects gestures only at positions within a limit as appropriate so that the illumination system is less likely to perform unwanted operation.

When the motion detector 110 is an active infrared sensor or a microwave sensor as described above, the motion detector 110 is further capable of detecting the moving velocity of a user. Thus, the LED light source 300 (illumination control device) may further include a velocity measurement unit which measures the velocity of a person detected by the motion detector 110 upon the detecting of the person. When the motion detector 110 is an active infrared sensor or a microwave sensor as described above, the velocity measurement unit is implemented as a function of the motion detector 110.

The velocity measurement unit measures velocity by determining a temporal change in distance measured using the distance measurement function or a temporal change in position located by the position locating function.

The control unit 150 controls illumination of the LED light source 300 based on a result of detection by the motion detector 110 when velocity measured by the velocity measurement unit is within a predetermined range.

More specifically, when the control unit 150 determines that the velocity measured by the velocity measurement unit is lower than a predetermined velocity and that the person detected by the motion detector 110 remains at the same position, the control unit 150 recognizes movements of a user as gestures of the user.

When the control unit 150 determines that the velocity measured by the velocity measurement unit is not lower than a predetermined velocity and that a person detected by the motion detector 110 is moving from one place to another, the control unit 150 does not recognize movements of a user as gestures of the user. In other words, the control unit 150 does not recognize, as gestures, movements of a person merely passing through the detection range of the motion detector 110.

The LED light source 300 including the velocity measurement unit is thus unlikely to recognize movements of a user merely passing by the illumination system as gestures. Thus, the illumination system is less likely to perform unwanted operation.

Note that the control unit 150 is capable of recognizing a user's movements such as making circular motions with the user's arm as gestures, by using the above described data of feature. In this case, the memory unit prestores data of features corresponding to the movement of making circular motions with an arm of a user.

The above is a description of the LED light source 300 according to Embodiment 2 of the present invention.

In Embodiment 2, the LED light source 300 having the illuminance control function and the LED light sources 300a and 300b not having the illuminance control function both have the function of ON-OFF control of the LED light sources according to the motion detectors. Thus, it is difficult for the user 340 to tell whether or not the LED light source 300 has the illuminance control function. In view of this, the LED light source 300 may be designed in a shape different from that of the other LED light sources or may be provided with an indicator or the like indicating the function. With this, users can visually recognize which LED light source allows for illuminance control.

Figure 16:
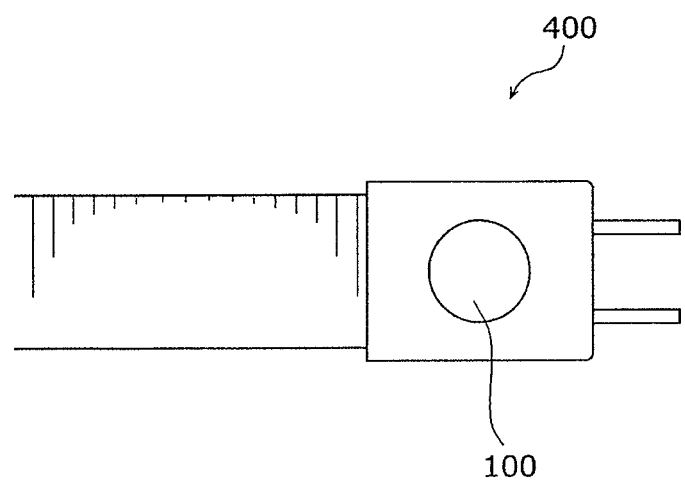
FIG. 16 is a drawing for describing a variation of the LED light sources.

The LED light source according to the present invention is not limited to the LED light source 300 described as a bulb-type LED lamp for Embodiment 2. For example, the LED light source according to the present invention may be a straight-tube LED light source 400 having the illumination control device 100 at its end portion as shown in FIG. 16.

The LED light source according to Embodiment 2 is applicable also to an illumination system for an escalator, for example.

Figure 17:
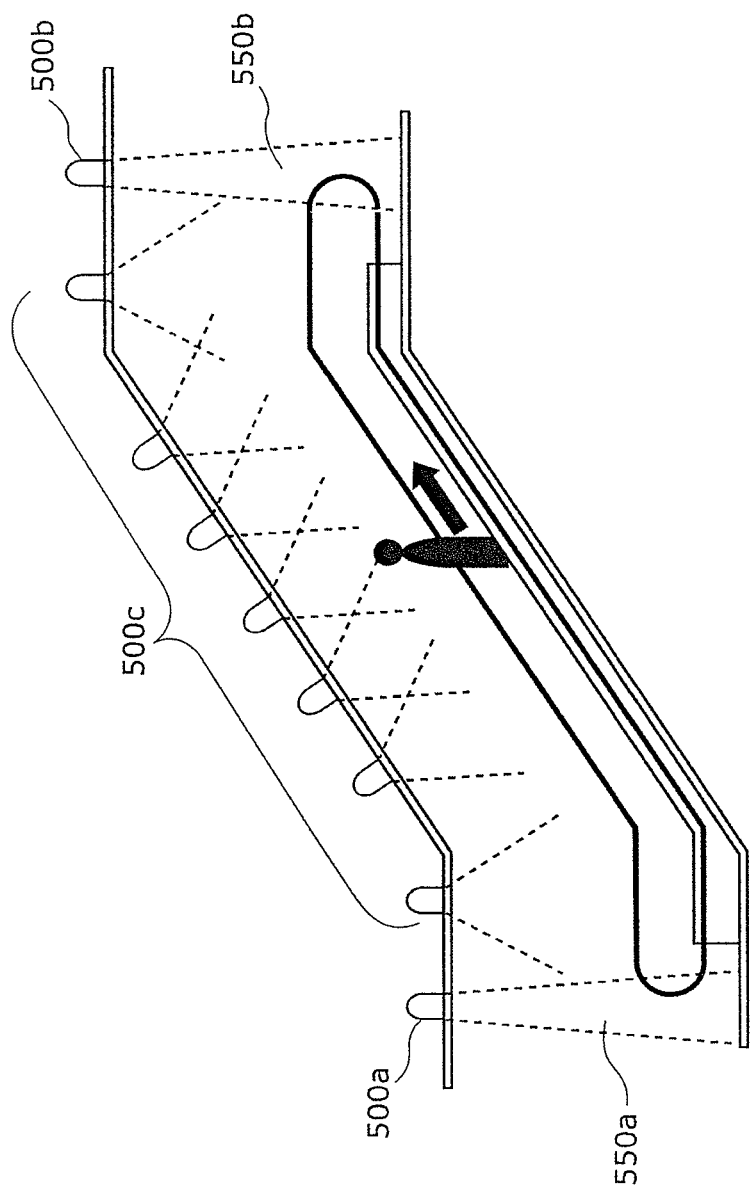
FIG. 17 schematically illustrates an exemplary application of the LED light source according to Embodiment 2 to an escalator.

FIG. 17 schematically illustrates an exemplary application of the LED light source according to Embodiment 2 to an escalator. The following describes, as an example, operation of an escalator ascending from the first floor to the second floor, and the same applies to operation descending from the second floor to the first floor.

An illumination system for an escalator illustrated in FIG. 17 includes an LED light source 500a and an LED light source 500b. The LED light source 500a is installed in the ceiling above the landing at the foot of the escalator on the first floor. The LED light source 500b is installed in the ceiling above the landing at the head of the escalator on the second floor. The LED light sources 500a and 500b are each an LED light source having a gesture detection function as illustrated in FIG. 11 and FIG. 12, and a master illumination device in the illumination system in FIG. 17.

Furthermore, the ceiling above the escalator is provided with LED light sources 500c arranged along the escalator. The LED light sources 500c are each a general LED light source with a motion detector, that is, an LED light source without gesture detection function. The LED light sources 500c are what is called slave illumination devices in the illumination system in FIG. 17.

It is difficult for the LED light sources 500a and 500b to distinguish and detect gestures among movements of users of the escalator in the detection ranges of the LED light sources 500a and 500b, that is, detection ranges 550a and 550b because the users pass through the detection ranges one after another. Thus, the illumination system in FIG. 17 has the following configuration so that unwanted operation is less likely to occur.

First, the LED light sources 500a and 500b each detect an ON period not shorter than 30 seconds as an illuminance control gesture. More specifically, when the motion detector of the LED light source 500a (LED light source 500b) detects a period not shorter than 30 seconds during which any person is present in the detection range 550a (detection range 550b), the LED light sources 500a and 500b shift to the illuminance control mode.

Secondly, the LED light source 500a searches for an illuminance control gesture while no person is being detected by any of the motion detectors of the LED light source 500b and the LED light sources 500c. Similarly, the LED light source 500b searches for an illuminance control gesture while no person is being detected by any of the motion detectors of the LED light source 500a and the LED light sources 500c. In other words, the LED light sources 500a and 500b do not shift to the illuminance control mode while a person is present under at least one of the master illumination devices or the slave illumination devices. In other words, the LED light sources 500a and 500b search for an illuminance control gesture and may shift to the illuminance control mode when no person is present around the escalator.

The LED light source 500a is capable of determining whether or not any of the LED light source 500b and the LED light sources 500c is detecting a person, based on notification signals which the wireless module receives from the LED light source 500b and the LED light sources 500c. The LED light source 500b is also capable of the same determining.

The following describes ON-OFF operation of the illumination system in FIG. 17.

First, when the LED light source 500a detects a person, the control unit of the LED light source 500a causes the wireless module to transmit a control signal to turn on the LED light source 500b and the LED light sources 500c.

Next, when none of the LED light source 500a, the LED light source 500b, and the LED light sources 500c detects any person, the control unit of the LED light source 500a turns off the LED light sources sequentially from the one closest to the first floor.

More specifically, after elapse of a certain period of time, the control unit of the LED light source 500a first turns off the LED light source 500a, and then causes the wireless module to transmit control signals to turn off the LED light sources 500c sequentially from the one closest to the first floor. Finally, the control unit of the LED light source 500a causes the wireless module to transmit a control signal to turn off the LED light source 500b. The LED light sources are turned off with timing determined according to a predetermined speed of the escalator.

In the case where the LED light sources 500c do not include a motion detector, the control unit of the LED light source 500a turns on all the LED light source when the LED light source 500a detects a person. Next, when neither the LED light source 500a nor the LED light source 500b detects any person, the control unit of the LED light source 500a turns off the LED light sources sequentially from the one closest to the first floor.

Other Embodiments

The present invention is not limited to the above description of Embodiment 1 and Embodiment 2 of the present invention.

For example, the LED light sources in Embodiment 1 and Embodiment 2 are each described as a bulb-type LED lamp or a straight-tube type LED light source by way of example. However, a thin-flat LED unit for a downlight or a ring-shaped LED light source may also be used as LED light sources for the present invention. In other words, the present invention may be implemented as a thin-flat LED unit including the illumination control device 100 or a ring-shaped LED light source including the illumination control device 100.

The light sources in Embodiment 1 and Embodiment 2 are each described as a light source including an LED. However, semiconductor light-emitting element such as a semiconductor laser, an electroluminescence (EL) device such as an organic EL device or an inorganic EL device or any other solid-state light-emitting device may be used instead as the light source for the present invention. In other words, the present invention may be implemented as an illumination light source including the illumination control device 100 and a light-emitting device other than LEDs.

Furthermore, the following implementation is also within the scope of the present invention.

(1) Each of the above-described devices may be implemented specifically as a computer system including a microprocessor, a ROM, a RAM, a hard disk unit, a display unit, a keyboard, a mouse, and so on. The RAM or the hard disk unit stores a computer program. Operation of a microprocessor according to the computer program allows for functions of each of the devices. Here, the computer program includes a combination of instruction codes to indicate instructions to the computer so that the computer performs predetermined functions.

(2) All or part of the constituent elements included in any of the devices may be a single system large-scale integration (LSI). The system LSI is a super-multifunctional LSI manufactured by integrating constituent units on one chip, and is specifically a computer system including a microprocessor, ROM, and RAM. The ROM stores a computer program. The microprocessor loads the computer program from the ROM into the RAM, and the system LSI achieves its functions by performing operations according to the loaded computer program.

(3) All or part of the constituent elements included in any of the devices above may be an integrated circuit (IC) card or a unit of a module attachable to any of the devices. Each of the IC card and the module is a computer system including components such as a microprocessor, a ROM, and a RAM. The IC card and the module may each include the above-described super-multifunctional LSI. The microprocessor operates according to the computer program, so that the IC card or the module performs its functions. The IC card and the module may be tamper-resistant.

(4) The present invention may be implemented as the above-described method. Furthermore, the present invention may be implemented as a computer program for performing the method, using a computer, and may also be a digital signal indicating the computer program.

The present invention may also be implemented as a computer-readable recording medium, such as a flexible disk, a hard disc, a CD-ROM, an MO, a DVD, a DVD-ROM, a DVD-RAM, Blu-ray Disc (BD, Blu-ray Disc is a registered trademark), a semiconductor memory, or the like on which the computer program or the digital signal is recorded. Optionally, the present invention may be implemented as a digital signal recorded on any of these recording media.

The present invention may also be implemented as a computer program or a digital signal transmitted via an electric telecommunication line, wire or wireless communication line, a network typified by the Internet, or data broadcasting.

Furthermore, the present invention may also be implemented as a computer system including a microprocessor and a memory, where the memory stores the computer program, and the microprocessor operates according to the computer program.

The program or the digital signal may be recorded on a recording medium for transportation or transmitted through a network or the like so that the program is executed on another independent computer system.

(5) The embodiment and the variations described above may be selected and combined.

The present invention is not limited to the present embodiment or the variations thereof. Variations of the embodiments which would occur to those skilled in the art and embodiments in which the constituent elements in the present embodiments or the variations thereof, are also within the scope of the present invention unless they depart from the spirit of the present invention.

INDUSTRIAL APPLICABILITY

The illumination control device according to the present invention allows for easy control of illuminance, color, and distribution of light according to a gesture, and is therefore usable as an illumination control device for illumination devices for room lighting and so on.

REFERENCE SIGNS LIST 100 illumination control device
110, 110a, 110b, 111 motion detector
120 illuminance sensor
130 wireless module
140 light-emitting element
150 control unit
160 transmitter
170 receiver
180, 380 translucent member
185a to 185f, 230 substrate
190, 390 patterned antenna
195 socket
200, 200a to 200e illumination device
210, 300, 300a, 300b, 400, 500a to 500c LED light source (illumination light source)
210a LED
220 switching circuit
240, 340 user
250a to 250c period
310 globe
320 cap
330 casing
335 circuit case
235, 350, 350a, 350b, 351, 352, 550a, 550b detection range

The invention claimed is:

1. An illumination control device which controls an illumination light source, the illumination control device comprising:
 a motion detector; and
 a control unit configured to perform control of illuminance, color, or distribution of light of the illumination light source while the illumination light source is ON, based on an ON period or an OFF period, the ON period being a period during which a person is detected by the motion detector, and the OFF period being a period during which no person is detected by the motion detector.

2. The illumination control device according to claim 1, further comprising
 a velocity measurement unit configured to measure a moving velocity of a person detected by the motion detector,
 wherein when the moving velocity measured by the velocity measurement unit is within a predetermined range, the control unit is configured to perform the control of the illuminance, color, or distribution of the light of the illumination light source based on the ON period or the OFF period.

3. The illumination control device according to claim 1, wherein the illumination light source is a light emitting diode (LED) light source.

4. The illumination control device according to claim 1, wherein the control unit is configured to perform the control of the illuminance, color, or distribution of the light of the illumination light source based on a total number of occurrences of the OFF period, the OFF period having a predetermined duration or longer in a predetermined period.

5. The illumination control device according to claim 1, wherein the control unit is configured to perform the control of the illuminance, color, or distribution of the light of the illumination light source based on a total number of occurrences of the ON period, the ON period having a predetermined duration or longer in a predetermined period.

6. An illumination light source comprising
 the illumination control device according to claim 1.

7. The illumination control device according to claim 1, wherein the control unit is configured to detect a total number of occurrences of the ON period or a total number of occurrences of the OFF period, and perform the control of the illuminance, color, or distribution of the light of the illumination light source by performing processing dependent on the total number of detected occurrences.

8. The illumination control device according to claim 1, wherein if the control unit detects the ON period or the OFF period a plurality of times, the control unit is configured to perform control in a first operation mode for changing a state of the illuminance, color, or distribution of the light in a cycle, and
 if the motion detector detects a person while the control unit is performing the control in the first operation mode, the control unit is configured to stop changing the state of the illuminance, color, or distribution of the light, to maintain the state of the illuminance, color, or distribution of the light when the motion detector detects the person.

9. The illumination control device according to claim 1, further comprising
 a light-emitting element which emits light in an ON period which is a period during which a person is detected by the motion detector.

10. The illumination control device according to claim 1, further comprising
 an illuminance sensor which measures illuminance around the illumination control device,
 wherein when the illuminance measured by the illuminance sensor is lower than a predetermined illuminance, the control unit is configured to perform the control of the illuminance, color, or distribution of the light of the illumination light source based on the ON period or the OFF period.

11. The illumination control device according to claim 1, further comprising
a distance measurement unit configured to measure a distance from the illumination control device to a person detected by the motion detector,
wherein when the distance measured by the distance measurement unit is within a predetermined range, the control unit is configured to perform the control of the illuminance, color, or distribution of the light of the illumination light source based on the ON period or the OFF period.

12. The illumination control device according to claim 1, further comprising
a position locating unit configured to locate a position of a person detected by the motion detector,
wherein when the position located by the position locating unit is within a predetermined range, the control unit is configured to perform the control of the illuminance, color, or distribution of the light of the illumination light source based on the ON period or the OFF period.

13. An illumination control device which controls an illumination light source, the illumination control device comprising:
a motion detector;
a control unit configured to perform control of illuminance, color, or distribution of light of the illumination light source while the illumination light source is ON, based on an ON period or an OFF period, the ON period being a period during which a person is detected by the motion detector, and the OFF period being a period during which no person is detected by the motion detector;
a transmitter which wirelessly transmits, to the illumination light source, a control signal to allow the control unit to perform the control of the illuminance, color, or distribution of the light of the illumination light source, wherein the transmitter wirelessly transmits the control signal to a plurality of illumination light sources including the illumination light source; and
a receiver which receives a notification signal wirelessly transmitted from an illumination light source among the plurality of the illumination light sources, the notification signal indicating that the illumination light source is ON,
wherein when the receiver receives the notification signal, the control unit is configured to perform the control to cause all of the plurality of the illumination light sources to illuminate in a same state of illuminance, color, or distribution of light by causing the transmitter to wirelessly transmit the control signal to the plurality of the illumination light sources.

14. An illumination system comprising
a plurality of illumination devices including a master illumination device and a plurality of slave illumination devices,
the master illumination device including:
an illumination light source;
a motion detector;
a control unit configured to perform control of illuminance, color, or distribution of light of the illumination light source of the master illumination device based on an ON period or an OFF period, the ON period being a period during which a person is detected by the motion detector, and the OFF period being a period during which no person is detected by the motion detector; and
a transmitter which wirelessly transmits, to the plurality of slave illumination devices, a control signal to allow the control unit to perform the control of the illuminance, color, or distribution of the light of the plurality of slave illumination devices, and
the plurality of slave illumination devices each including:
an illumination light source; and
a receiver which receives the control signal wirelessly transmitted from the transmitter,
wherein when the control unit performs the control to place the illuminance, color, or distribution of the light of the illumination light source of the master illumination device in a first state based on the ON period or the OFF period, the control unit is configured to perform the control to place the illuminance, color, or distribution of the light of the illumination light source of each of the slave illumination devices in the first state by causing the transmitter to transmit the control signal to the receiver of each of the slave illumination devices.

* * * * *